US012466306B2

United States Patent
Gatsios et al.

(10) Patent No.: US 12,466,306 B2
(45) Date of Patent: Nov. 11, 2025

(54) ILLUMINATION ARRANGEMENT WITH A CONTROL UNIT, WITH AN ILLUMINATION MODULE AND A PERIPHERAL MODULE

(71) Applicant: Hella GmbH & Co. KGaA, Lippstadt (DE)

(72) Inventors: Sebastian Gatsios, Arnsberg (DE); Florian Herold, Bielefeld (DE); Dirk Kliebisch, Paderborn (DE); Ingo Moellers, Rietberg (DE); Alexander Schwan, Kamen (DE); Patrick Vogel, Unna (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 243 days.

(21) Appl. No.: 18/326,215

(22) Filed: May 31, 2023

(65) Prior Publication Data
US 2023/0382292 A1    Nov. 30, 2023

(51) Int. Cl.
*B60Q 1/076*    (2006.01)
*H05B 45/20*    (2020.01)

(52) U.S. Cl.
CPC ............. *B60Q 1/076* (2013.01); *H05B 45/20* (2020.01)

(58) Field of Classification Search
CPC ................................ B60Q 1/076; H05B 45/20
See application file for complete search history.

(56) References Cited

U.S. PATENT DOCUMENTS

| 9,582,237 B2 * | 2/2017 | Hall ..................... H01H 11/04 |
| 2019/0197934 A1 * | 6/2019 | El Idrissi ............... H05B 45/20 |

FOREIGN PATENT DOCUMENTS

| DE | 4031780 A1 * | 4/1992 |
| DE | 102019004909 A1 * | 1/2021 |
| DE | 102020124960 A1 | 3/2022 |

OTHER PUBLICATIONS

DE-102019004909-A1 Machine Translation (Year: 2021).*
DE-4031780-A1 Machine Translation (Year: 1992).*

* cited by examiner

*Primary Examiner* — Alexander H Taningco
*Assistant Examiner* — Pedro C Fernandez
(74) *Attorney, Agent, or Firm* — Husch Blackwell LLP

(57) ABSTRACT

An illumination arrangement is provided with a control unit, an illumination module including an LED matrix for the generation of light, and a peripheral module connected to the illumination module. The control unit generates data for controlling the illumination module and for controlling the peripheral module. The data for controlling the illumination module and for controlling the peripheral module is transferred to the illumination module. The data for controlling the peripheral module is transferred to the peripheral module. An RGB signal is generated by the control unit for generating a light pattern by the illumination module, and is transferred to the illumination module. The image data of the RGB signal is the data for controlling the illumination module or at least forms a part of the data for controlling the illumination module, and the RGB signal has a range not used for image data.

9 Claims, 2 Drawing Sheets

ILLUMINATION ARRANGEMENT WITH A CONTROL UNIT, WITH AN ILLUMINATION MODULE AND A PERIPHERAL MODULE

CROSS REFERENCE

This application claims priority to German Application No. 10 2022 113653.1, filed May 41, 2022, the entirety of which is hereby incorporated by reference.

FIELD OF THE INVENTION

The invention relates to an illumination arrangement, in particular for a motor vehicle, with a control unit, with an illumination module featuring an LED matrix for generating light connected to the control unit via a bidirectional first channel, and with a peripheral module connected to the illumination module via a second channel, where data for controlling the illumination module and data for controlling the peripheral module can be generated with the control unit, where the data for controlling the illumination module and data for controlling the peripheral module can be transferred to the illumination module via the first channel and where the data for controlling the peripheral module can be transferred to the peripheral module via the second channel.

BACKGROUND OF THE INVENTION

The inventors are aware of an illumination arrangement with some of these features. The data used for controlling the illumination module is essentially data for controlling the LED matrix with which various light patterns can be generated to generate light with the illumination module. The illumination module can be, for example, a part of a front headlamp of a motor vehicle with which various light distributions or light patterns can be generated, for example low beam, high beam, dynamic cornering light, etc. The data for controlling the illumination module is generated in the control unit and transferred to the illumination module via the first channel.

The peripheral module is not connected to the control unit but attached to the illumination module. The data for controlling the peripheral module is transferred from the illumination module to the peripheral module via a second channel. This data for controlling the peripheral module is not determined in the illumination module, however. Rather, it is transferred from the control unit to the illumination module via the first channel like the data for controlling the illumination module. From the illumination module, the data for controlling the peripheral module is transferred to the peripheral module via the second channel.

Consequently, the first channel must be designed in such a way that not only the data for controlling the illumination module but also the data for controlling the peripheral module can be transferred via the first channel.

As far as the inventors are aware, various bus systems were used to date for this purpose.

BRIEF SUMMARY OF THE INVENTION

The inventors set themselves the task of creating a simple possibility for the compressed transfer of the data for controlling both the illumination module and the peripheral module.

According to the invention, this task is solved by the fact that the control unit can generate an RGB signal and that the RGB signal for generating a light pattern by the illumination module can be transferred to the illumination module via the first channel, where image data of the RGB signal is the data for controlling the illumination module or at least forms a part of the data for controlling the illumination module, and that the RGB signal has a range that is not used for image data, for example what is referred to as the blanking range, that contains further data for controlling the illumination module.

The use of an RGB signal facilitates a direct kind of control of the LED matrix of the illumination module. Integration of the data for controlling the peripheral module into the RGB facilitates a compressed data transfer. A further channel or a subdivision of the first channel using a multiplex or similar method is therefore unnecessary. The bandwidth of the first channel is increased through the use of the range of the RGB signal not used for image data, for example the blanking range.

But not only data for controlling the peripheral module can be transferred in the range of the RGB signal not used for the image data. It is also possible for further data for controlling the illumination module to be transferred in this range from the control unit to the illumination module.

According to the invention, it is possible that the second channel, via which data is transferred from the peripheral module to the illumination module after it has been received by the illumination module from the control unit via the first channel, is a bidirectional channel.

An inventive illumination arrangement can feature a headlamp. The illumination module and the peripheral module can be modules of this headlamp.

The peripheral module can comprise a drive for driving mechanical components of the headlamp. The drive can be a stepper motor, for example a stepper motor for swiveling the illumination module or a cover for shading the light generated by the illumination module.

The peripheral module can be a light matrix manager.

It is possible for the illumination arrangement to feature several peripheral modules.

The data that can be transferred from the peripheral module to the illumination module can be, for example, diagnostic data that provides information on the state of the peripheral module.

The first channel can be conducted via a UART connection, an SPI connection, an I2C connection, a GMSL connection or any other suitable connection. The RGB signal can, however, also be conducted directly via cables and interfaces suitable for RGB signals.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

Figure 1:
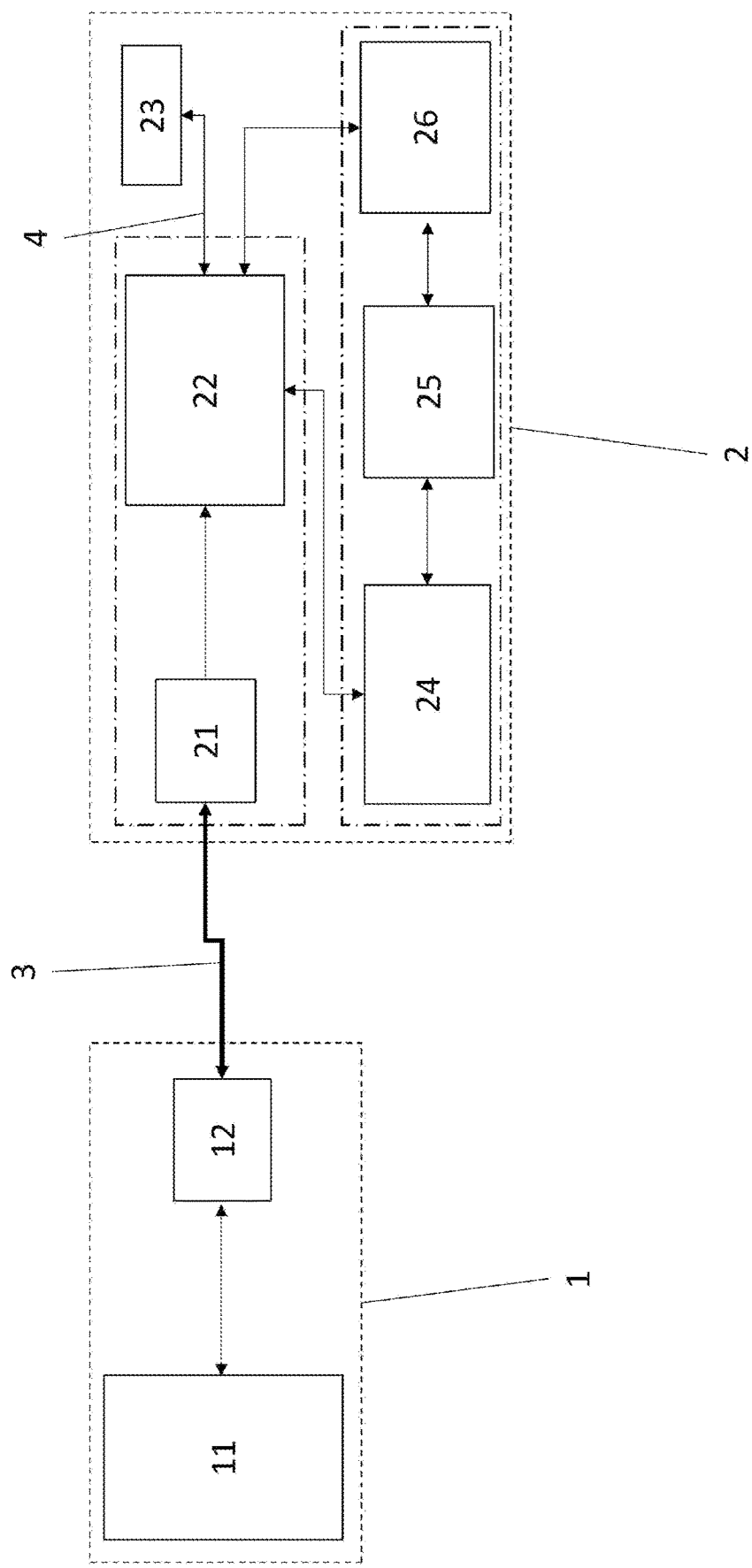
FIG. 1 is a schematic, simplified block diagram of the inventive arrangement.

The inventive illumination arrangement comprises a control unit 1 and a headlamp 1 with an illumination module 21, 22, a power supply 24, 25, 26 for the illumination module 21, 22 and a peripheral module, which can be a stepper motor.

The control unit 1 features a microcontroller 11 with which data for controlling the illumination module and for controlling the peripheral module 23 of the headlamp 1 can be generated. This data is transmitted via an interface 12 of the control unit 1 and a cable 3 to an interface 21 of the illumination module 21, 22. A first channel is set up via the interfaces 12, 21 and the cable, via which the data for controlling the illumination module and for controlling the peripheral module 23 can be transferred.

An SSL chip 22 that bears an LED matrix receives the data for controlling the illumination module 21, 22 and for controlling the peripheral module 23. The data for controlling 21, 22 the illumination module is processed by the SSL chip 22.

A part of the data, namely image information, is processed by the SSL chip 22 in order to set the desired light pattern or the desired light distribution.

A further part of the data for controlling the illumination module 21, 22 is forwarded to the power supply 24, 25, 26. For this purpose, the SSL chip has an interface that is connected via a CAN bus to an interface 24 of the power supply. The interface 23 is connected to a microcontroller 25 of the power supply that actuates a power unit 26 of the power supply 24, 25, 26, via which the LED matrix or, as the case may be, individual LEDs of the LED matrix are supplied with power.

Furthermore, the SSL chip 22 extracts from the data received the data for controlling the peripheral module 23 and makes it available at the interface at which this data is then transferred via a cable 4 to the peripheral module 23. A second channel is set up for this purpose via the interface and the cable.

A modified RGB signal is transferred via the first channel. Just like every RGB signal, the RGB signal contains control information for generating the image, in the present case the image information for generating the desired light pattern. Alongside this data, the RGB signal, which is a modification of a conventional RGB signal, also contains data for controlling the power supply 24, 25, 26 of the illumination module 21, 22 and for controlling the peripheral module 23. This data is transferred in a range of the RGB signal that is not used for the image information on the light pattern or the light distribution. This is preferentially what is known as the blanking range.

Figure 2:
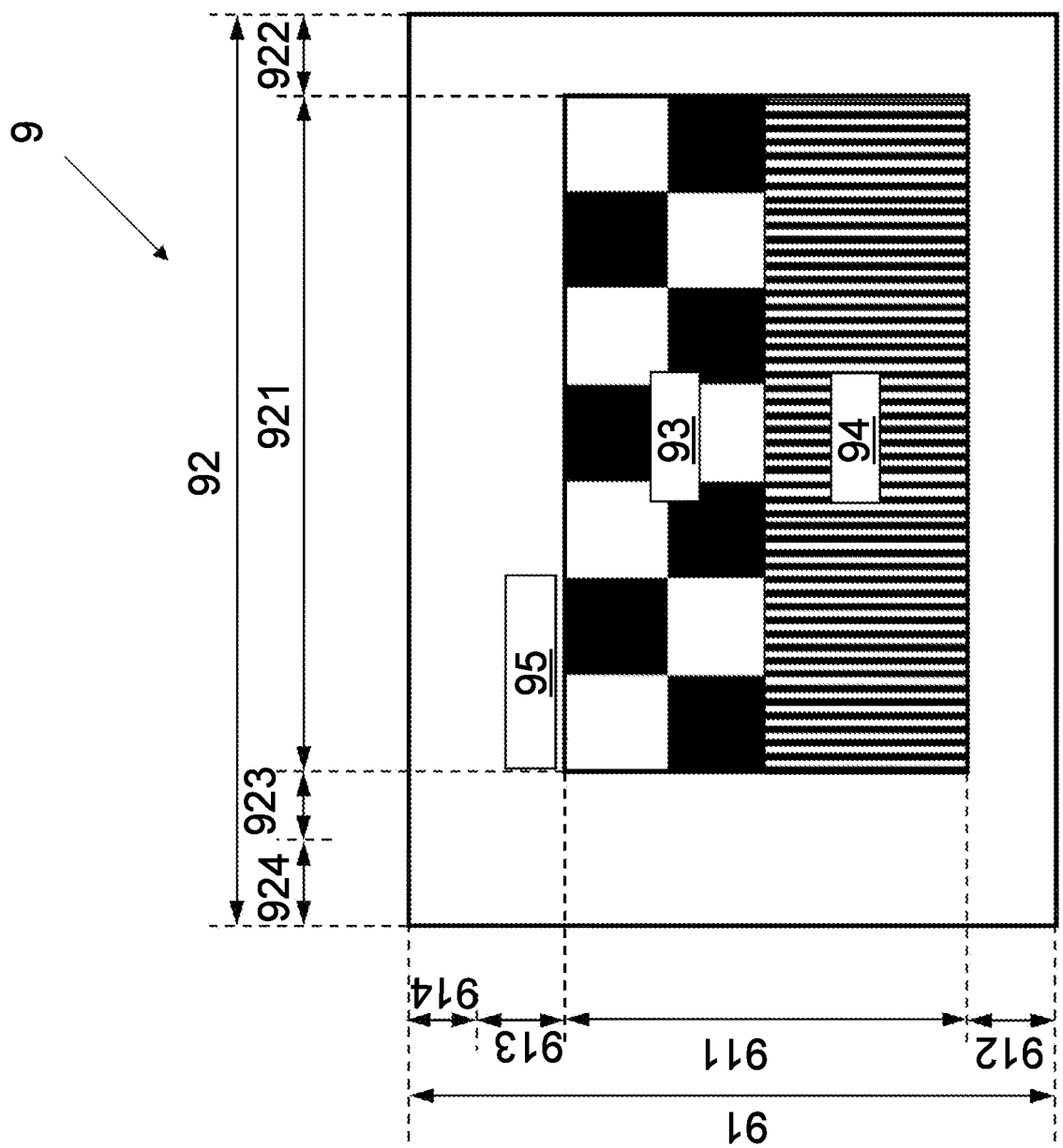
FIG. 2 is a representation of an RGB signal.

FIG. 2 shows the schematic layout of an individual video image 9 RGB signal.

The video image 9 has a total height of 91 and a total width of 92. The total height 91 is subdivided into four ranges 911, 912, 913, 914. The first range designates the active height 911. The first range in the lower range of the image is bordered by the vertical front porch 912 and in the upper range of the image by the vertical back porch 913. Furthermore, a range of the vertical synchronization 914 borders on the vertical back porch 913.

The total width 92 can likewise be subdivided into four ranges 921, 922, 923, 924. The first range designates the active width 921; in the right portion of the image, this is surrounded by the horizontal front porch 922 and in the left portion of the image by the horizontal back porch 923. The horizontal back porch 923 is bordered by a range of the horizontal synchronization 924.

The useful information in the video signal is transmitted in the range spanned by the active height 911 and the active width 921. This range can, in turn, be subdivided into a first video image portion 93 and a second video image portion 94. For each video image portion 93, 94, the luminance values of the individual LEDs of the LED matrix of the SSL chip 22 are coded in 16383 pixels.

The unused range of the video image, the blanking range, is located outside of the range spanned by the active height 911 and the active width 921. This blanking range also includes the vertical back porch 913 in which the data 95 for controlling the power supply and for controlling the peripheral module is transferred.

LIST OF REFERENCE NUMBERS

1 Control unit
11 Microcontroller
12 Interface
2 Headlamp
21 Interface
22 SSL chip
23 Peripheral module
24 Interface
25 Microcontroller
26 Power unit
3 Cable for the first channel
4 Cable for the second channel
9 Video signal of an RGB image
91 Total height
911 Active height
912 Vertical front porch
913 Vertical front porch
914 Vertical synchronization
92 Total width
921 Active width
922 Horizontal front porch
923 Horizontal front porch
924 Horizontal synchronization
93 First part video image
94 Second part video image
95 Range of the range of the RGB signal not used for image data that is used for data to control the power supply and the peripheral module

The invention claimed is:

1. An illumination arrangement comprising:
   a control unit;
   an illumination module connected to the control unit via a bidirectional first channel, wherein the illumination module includes an LED matrix for generating light; and
   a peripheral module connected to the illumination module via a second channel;
   wherein the control unit generates data for controlling the illumination module and data for controlling the peripheral module,
   wherein the data for controlling the illumination module and the data for controlling the peripheral module are transferred to the illumination module via the first channel,
   wherein the data for controlling the peripheral module is transferred to the peripheral module via the second channel,
   wherein the control unit generates an RGB signal for generating a light pattern by the illumination module, and transfers the RGB signal to the illumination module via the first channel, wherein image data of the RGB signal is the data for controlling the illumination module or forms a part of the data for controlling the illumination module, and
   wherein the RGB signal has a range that is not used for image data, wherein the data for controlling the peripheral module is included in the range of the RGB signal that is not used for image data.

2. The illumination arrangement in accordance with claim 1, wherein the RGB signal has a range which is a blanking range that contains further data for controlling the illumination module.

3. The illumination arrangement in accordance with claim 1, wherein the second channel is a bidirectional channel via which data is transferred from the peripheral module to the illumination module and, after being received by the illumination module, is transferred to the control unit via the first channel.

4. The illumination arrangement in accordance with claim 1, further including a headlamp, wherein the illumination module and the peripheral module are modules of the headlamp.

5. The illumination arrangement in accordance with claim 4, wherein the peripheral module includes electromechanical actors, by which lighting technology properties of the illumination module are manipulated or are performed via a drive of mechanical components of the headlamp.

6. The illumination arrangement in accordance with claim 5, wherein the drive is a stepper motor for swiveling the illumination module or a cover for shading the light generated by the illumination module.

7. The illumination arrangement in accordance with claim 1, wherein the peripheral module is a light matrix manager or an IC for controlling light functions.

8. The illumination arrangement in accordance with claim 1, wherein the data transferred from the peripheral module to the illumination module is diagnostic data that shows the state of the peripheral module.

9. The illumination arrangement in accordance with claim 1, wherein the first channel is conducted via a UART connection, SPI connection, a I2C connection, or a GMSL connection.

* * * * *